Patented Feb. 22, 1927.

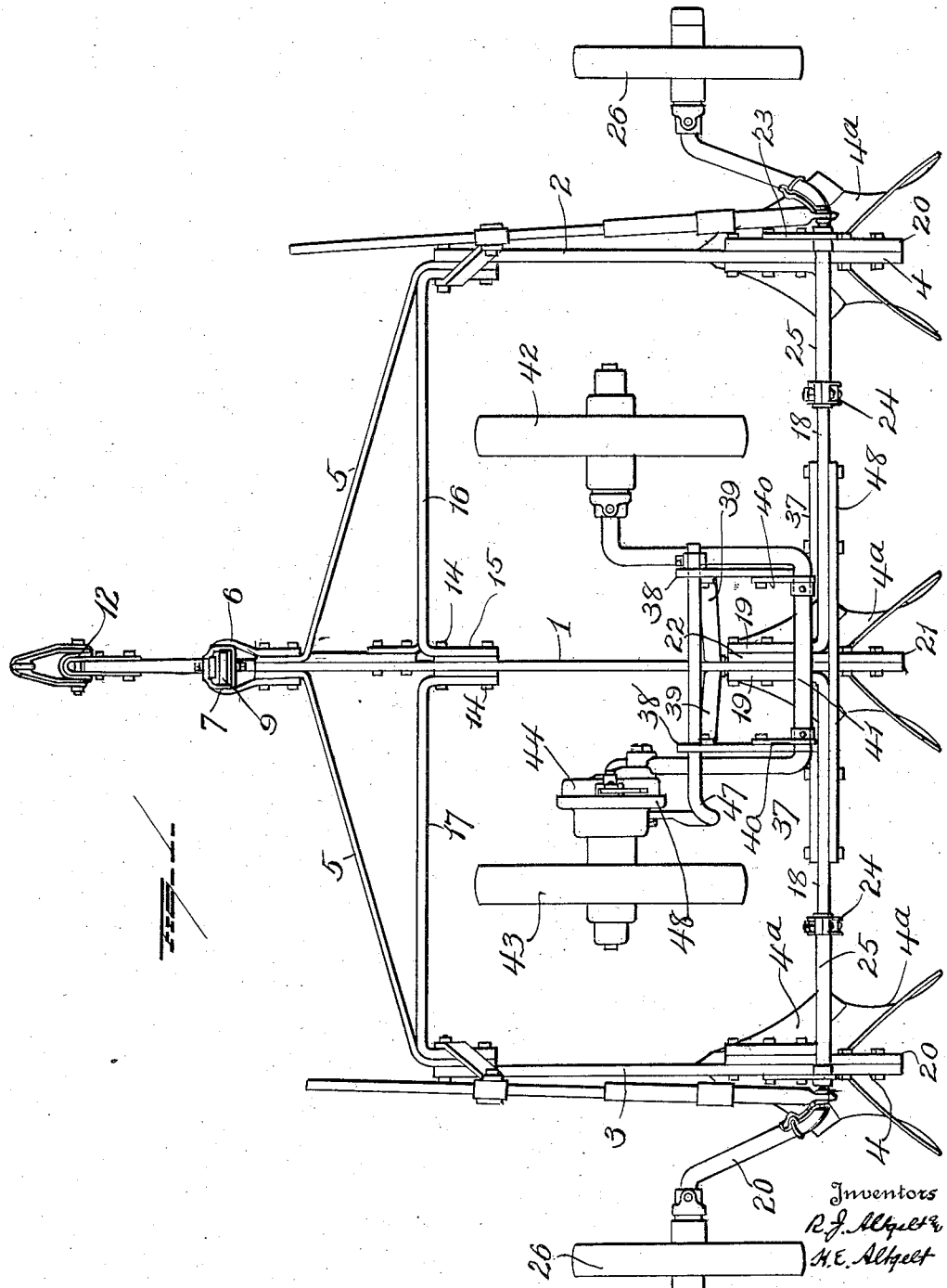

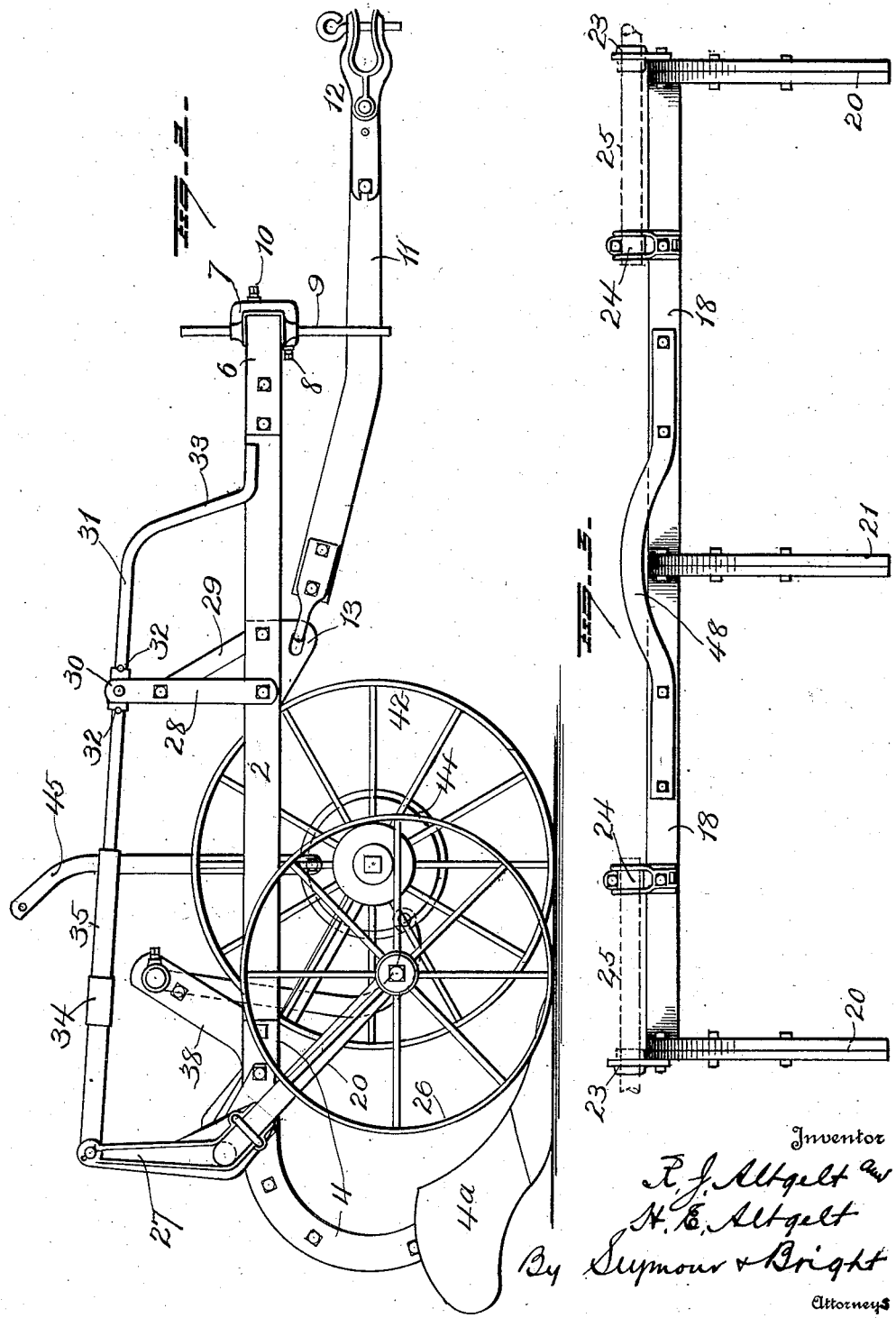

1,618,693

UNITED STATES PATENT OFFICE.

RUDOLPH J. ALTGELT AND HERMAN E. ALTGELT, OF SOUTH BEND, INDIANA, ASSIGNORS TO OLIVER CHILLED PLOW WORKS, OF SOUTH BEND, INDIANA.

PLOW.

Application filed February 11, 1926. Serial No. 87,618.

This invention relates to improvements in plows and more particularly to those of the three-row-lister type, one object of the invention being to so construct a lister plow that power lift means shall be so arranged that the outer ground wheels will be suspended out of contact with the ground when the plow bases are in raised position, and so that said outer ground wheels and their axles may be utilized for adjusting the plow bases for depth of penetration, and so that the axles of said outer ground wheels may be so independently adjusted as to effect leveling of the lister and uniform penetration of the several plow bases.

With these and other objects in view. the invention consists in certain novel features of construction and combinations of parts as hereinafter set forth and pointed out in the claims.

In the accompanying drawings,—

Figure 1 is a plan view of a three-row-lister plow embodying our improvements.

Figure 2 is a side elevation, and

Figure 3 is a partial rear view.

In the embodiment of the invention shown in the drawings, a central plow beam 1 and side beams 2 and 3 are employed and suitably spaced apart as will hereinafter appear.
The rear ends of the several beams 1, 2 and 3 extend downwardly to form standards 4, to which plow bases 4ᵃ are secured. To respective sides of the forward end portion of the central beam 1, the forward ends of braces 5 are secured and these braces extend laterally from their connection with the central beam and at their outer ends they are secured to the forward ends of the side beams 2—3. Respective ends of a loop or bracket 6 are secured to the forward end of the beam 1 (and also the forward ends of the braces 5) and projects forwardly from the same. A clamp 7 is mounted on the bracket or loop 6 (being secured thereto by a screw 8) and receives a vertical guide member 9 normally secured thereto by means of a clamping screw 10. The lower portion of the guide member 9 is suitably slotted for the passage of a draft beam 11, to the forward end of which, suitable clevis devices 12 are connected for attachment to a tractor. The rear end of the draft beam 11 is pivotally connected to a bracket 13 depending from the central plow beam rearwardly of its forward end. This bracket is held in place by bolts 14 which latter also pass through an arm 15 of a brace 16, the outer end of the latter being secured to the side beam 2, preferably by means of the same bolts which secure one of the braces 5 to said side beam. Another brace 17 is secured at its outer end to the side beam 3 by means of the same bolt which secure the other brace 5 to said beam 3.

Rear braces or frame members 18 are secured at their outer ends to the rear portions of the side beams 2 and 3 respectively and at their inner ends, these braces 18 are provided with forwardly projecting arms 19 disposed at respective sides of the rear portion of the central beam 1. The standards at the rear ends of the beams 2 and 3 are reinforced by means of curved bars 20 secured thereto and to said beams. The standard at the rear end of the central beam 1 is reinforced by a curved bar 21 bolted thereto and projecting forwardly between one of the brace arms 19 and said central beam,—the forwardly projecting arm 22 of the reinforcing bar 21 being secured by the same bolts which pass through the central beam and the brace arms 19. Bearing brackets 23 are secured to the rear end portions of the side beams adjacent the standards thereof and other bearing brackets 24 are secured to the rear frame members 18 intermediate the ends of the latter and project upwardly from the same. Crank axle members 25 are mounted in the bearing brackets 23—24 at respective sides of the plow structure and the spindle portions of these crank axles enter the hubs of outer ground wheels 26—26. To each of the crank axle members 25 an upwardly projecting arm 27 is secured, preferably to the crank portion thereof. At each side of the frame a standard 28 is secured and braced as at 29. The upper end portions of these standards pivotally support sleeves 30 through which, operating shafts 31 are freely rotatable but prevented from longitudinal movement by means of pins 32. One end of this shaft is provided with a hand crank 33 and the other end portion is threaded and passes into a threaded member 34, the latter being provided with protecting tubular portions 35—36 and the latter are pivotally connected with upwardly projecting arms 27 on the axle members 25. By operating the threaded shafts 31, the crank axle members 25 will be caused to turn, moving the outer ground wheels 26 rearwardly and causing vertical movement of the plow beams to effect adjustment of the latter for depth of penetration. By operating one or the other of the shafts 31 the plow may be leveled and the uniform depth of penetration of the several plow bases effected.

Brackets 37 are secured to the rear brace members 18 between the central and side plow beams and are provided with forwardly and upwardly projecting portions 38 for a purpose presently explained, and braces 39 extending from the bracket arms 38 to the central beam 1. Bearing brackets 40 are secured to the bracket arms 38 for the accommodation of a centrally located crank axle 41, the respective spindle portions of which enter the hubs of inner ground wheels 42 and 43,—said inner ground wheels being normally rotatable freely on said spindle portions. Clutch mechanism 44 is disposed between the crank axle 41 and the ground wheel 43 and suitable means including a control lever 45 is provided for operating the clutch mechanism to connect the ground wheel with or disconnect it from the crank axle 41. To the rotatable member 46 of the clutch or lifting mechanism 44, a lifting bar 47 is connected and a portion of this lifting bar extends over the cranks of the axle 41 and through suitable openings in the bracket arms 38, and thus the lifting mechanism is connected with the frame.

It will be observed that the means whereby the plow is raised are located between the sides of the frame structure and that the mountings for this means are located near the center of the frame and the rear end of the latter. It is desirable therefore that the central portion of the rear end of the frame shall be effectually braced and for this purpose a bar 48 is employed,—said bar being secured to the respective rear brace members 18 and arched at its central portion over the standard of the centrally located plow base.

During the normal operation of the plow both the inner and outer ground wheels run on the ground. The plow is raised on the inner ground wheels and when so raised the outer ground wheels will rise with the frame and remain suspended above the ground when the plow is to be transported from place to place or when it is to be turned at the end of a row of furrows. Adjustment of penetration of the plow bases or the leveling of the latter cannot be reliably effected by devices cooperable with the centrally or inwardly located single piece crank axle but such adjustments may be readily and accurately effected by adjustment of the crank axle members 25 and the outer ground wheels 26.

Having fully described our invention what we claim as new and desire to secure by Letters Patent, is:

1. In a plow structure employing a plurality of plow bases, the combination with a frame, of lifting mechanism including ground wheels located between the sides of the frame, crank axle members projecting laterally from the frame, ground wheels on the spindle portions of said crank axle members, and manually operable means cooperable with said crank axle members whereby adjustment for depth of penetration of the plow bases may be effected.

2. In a plow structure comprising a frame and a plurality of plow bases, of crank axle members carried by the frame and projecting laterally therefrom, ground wheels receiving the spindle portions of said crank axle members, means for adjusting said crank axle members to effect adjustment for penetration of the plow bases, and power lift mechanism including a crank axle and ground wheels located between the sides of the frame and operable to raise the frame and said crank axle members and the wheels thereon.

3. In a multiple base lister plow, the combination with a frame, of power lift mechanism including ground wheels located between the sides of the frame, and depth adjusting mechanism including ground wheels located laterally of the frame at respective sides thereof and crank axle members connecting said last mentioned ground wheels with the frame.

4. In a lister plow, the combination with a frame, of a one piece crank axle mounted near the rear end of the frame and centrally between the sides of the latter, ground wheels between the sides of the frame and receiving the spindle portions of said crank axle, power lift means cooperable with one of said ground wheels, the crank axle and the frame, crank axle members projecting laterally from the frame, ground wheels receiving the spindle portions of said crank axle members, and manually operable means connected with said crank axle members for effecting adjustment of penetration of plow bases carried by the frame.

5. In a lister plow, the combination with a frame, of a one piece crank axle mounted near the rear end of the frame and centrally between the sides of the latter, ground wheels between the sides of the frame and receiving the spindle portions of said crank axle, power lift means cooperable with one of said ground wheels, the crank axle and the frame, crank axle members mounted at the rear end of the frame and projecting laterally therefrom, ground wheels receiving the spindle portions at the outer ends of said crank axle members, and manually operable means connected with said crank axle members whereby depth adjustment of the plow bases carried by the frame may be effected.

6. In a multiple base lister plow, the combination of a frame including rear brace members, brackets secured to said brace members and projecting forwardly and upwardly therefrom, bearing devices secured to said brackets, a crank axle mounted in said bearing devices, a reinforcing bar connecting the rear braces, ground wheels mounted on the respective spindle portions of said crank axle and located between the sides of the frame, power lift mechansim associated with one of said ground wheels, said crank axle and the brackets secured to the rear brace bars, and depth adjusting mechanism operable independently of said crank axle.

7. In a multiple base lister plow, the combination of three beams, forward braces connecting the side beams with the central beam, rear braces connecting the side beams with the central beam, brackets secured to the rear braces and projecting forwardly and upwardly therefrom at respective sides of the central beam, bracing means between said brackets and the central beam, plow bases connected with the several beams, an axle mounted near the rear end of the frame and having two cranks terminating in spindles, ground wheels on said spindles, and power lift mechanism associated with one of said ground wheels, the axle and the forwardly and upwardly projecting brackets.

8. In a multiple base lister plow, the combination with a frame carrying plow bases and power lift mechanism located between the sides of the frame, of crank axle members mounted on the frame and projecting laterally from respective sides thereof, ground wheels receiving the outwardly projecting spindle ends of the crank axle members, and manually operable means connected with said spindle members for turning them to adjust the frame and effect depth adjustment of the plow bases.

9. In a multiple base lister plow, the combination of three beams, plow bases connected with said beams, front and rear braces between the side and central beams, power lift mechanism including ground wheels located between the sides of the frame formed by the side beams, and depth adjusting mechanism including ground wheels located laterally from the respective side beams.

In testimony whereof, we have signed this specification.

RUDOLPH J. ALTGELT.
HERMAN E. ALTGELT.